(12) United States Patent
Friesen et al.

(10) Patent No.: US 12,371,884 B2
(45) Date of Patent: Jul. 29, 2025

(54) SYSTEMS AND METHODS FOR ATMOSPHERIC VAPOR EXTRACTION

(71) Applicant: Source Global, PBC, Scottsdale, AZ (US)

(72) Inventors: Cody Friesen, Scottsdale, AZ (US); Kamil Salloum, Scottsdale, AZ (US); Michael Robinson, Scottsdale, AZ (US)

(73) Assignee: SOURCE Global, PBC, Scottsdale, AZ (US)

( * ) Notice: Subject to any disclaimer, the term of this patent is extended or adjusted under 35 U.S.C. 154(b) by 474 days.

(21) Appl. No.: 17/795,222

(22) PCT Filed: Jan. 26, 2021

(86) PCT No.: PCT/US2021/015106
§ 371 (c)(1),
(2) Date: Jul. 25, 2022

(87) PCT Pub. No.: WO2021/154739
PCT Pub. Date: Aug. 5, 2021

(65) Prior Publication Data
US 2023/0078132 A1    Mar. 16, 2023

Related U.S. Application Data

(60) Provisional application No. 62/966,491, filed on Jan. 27, 2020.

(51) Int. Cl.
*B01D 53/04* (2006.01)
*B01D 53/047* (2006.01)
(Continued)

(52) U.S. Cl.
CPC ............ *E03B 3/28* (2013.01); *B01D 53/0462* (2013.01); *B01D 53/047* (2013.01);
(Continued)

(58) Field of Classification Search
CPC ..... E03B 3/28; B01D 53/0462; B01D 53/047; B01D 53/04; B01D 53/261; B01D 53/263;
(Continued)

(56) References Cited

U.S. PATENT DOCUMENTS

2007/0028769 A1 * 2/2007 Eplee .................... B01D 53/06
                                                              95/113
2012/0125020 A1    5/2012 Vandermeulen et al.
(Continued)

FOREIGN PATENT DOCUMENTS

| WO | 1999007951 | 2/1999 |
|----|-----------|--------|
| WO | 2009043413 | 4/2009 |
| WO | 2019050861 | 3/2019 |

OTHER PUBLICATIONS

International Search Report and Written Opinion dated Apr. 6, 2021 in PCT International Patent Application No. PCT/US2021/015106.

*Primary Examiner* — Frank M Lawrence, Jr.
(74) *Attorney, Agent, or Firm* — Fish & Richardson P.C.

(57) ABSTRACT

Systems and methods relating to a wearable atmospheric water generation device are described herein. Systems can comprise a sorbent material within a sorbent chamber configured to capture water vapor from ambient air and can be configured to produce a reduced pressure condition within the sorbent chamber, thereby desorbing water from the sorbent material. The systems can further comprise a condenser for producing liquid water from the desorbed water vapor.

20 Claims, 11 Drawing Sheets

(51) Int. Cl.
*B01D 53/26* (2006.01)
*B01D 53/28* (2006.01)
*E03B 3/28* (2006.01)

(52) U.S. Cl.
CPC ......... *B01D 53/261* (2013.01); *B01D 53/263* (2013.01); *B01D 53/28* (2013.01); *B01D 2252/30* (2013.01); *B01D 2253/202* (2013.01); *B01D 2253/204* (2013.01); *B01D 2253/25* (2013.01); *B01D 2257/80* (2013.01)

(58) Field of Classification Search
CPC ................ B01D 53/28; B01D 2252/30; B01D 2253/202; B01D 2253/204; B01D 2253/25; B01D 2257/80; Y02A 20/00
USPC ......... 95/1, 8, 10, 19, 21, 22, 117, 121–123, 95/231; 96/108, 109, 111, 113, 143–147
See application file for complete search history.

(56) References Cited

U.S. PATENT DOCUMENTS

| | | | |
|---|---|---|---|
| 2016/0089616 A1* | 3/2016 | Maruyama | E03B 3/28 |
| | | | 165/104.21 |
| 2018/0171604 A1* | 6/2018 | Kim | B01J 20/3204 |
| 2020/0122083 A1* | 4/2020 | Friesen | B01D 5/0069 |
| 2020/0282379 A1* | 9/2020 | Mulet | B01J 20/28011 |

\* cited by examiner

SYSTEMS AND METHODS FOR ATMOSPHERIC VAPOR EXTRACTION

CROSS-REFERENCE TO RELATED APPLICATIONS

This application is a U.S. national phase filing under 35 U.S.C. § 371 of PCT/US2021/015106 filed on Jan. 26, 2021 entitled "SYSTEMS AND METHODS FOR WEARABLE ATMOSPHERIC VAPOR EXTRACTION," which claims priority to, and the benefit of, U.S. Provisional Patent Application No. 62/966,491 filed on Jan. 27, 2020, which is entitled "SYSTEMS AND METHODS FOR WEARABLE ATMOSPHERIC VAPOR EXTRACTION," the entireties of which are incorporated herein by reference.

TECHNICAL FIELD

This disclosure is related to wearable, portable, individual and/or small-scale systems and methods for generating or extracting liquid water from ambient air.

BACKGROUND

Producing liquid water by extracting water vapor from ambient air or atmospheric air can present various challenges. Certain challenges include those associated with maximizing a water production rate and/or efficiency at a low cost and high reliability.

Water generation systems can transfer the latent heat of condensation of water (around $\Delta H_{vap}$=660 Wh/kg at ambient conditions) from its vapor phase to condense the gas. Conventional water generation device solutions typically are grid-tied systems encompassing a traditional dehumidification cycle, such as direct refrigeration and condensation of atmospheric water vapor. A subset of these systems can include a traditional liquid desiccation loop purposed at expanding the psychrometric range of the refrigeration loop in order to extract more water vapor. In conventional atmospheric water generators employing direct cooling of ambient air via direct refrigeration and condensation, the amount of energy input can be lower via leveraging a refrigerant as a working fluid in a closed loop cycle (e.g. vapor compression). However, the ratio of the heat of condensation to the energy input—the coefficient of performance (COP)—can vary by several orders of magnitude over the range of potential field-deployed environments (e.g., based on the relative humidity of those environments). For typical refrigerants (e.g., typically characterized on the order of 40 Wh/kg), there is an energetic cost for closing the thermodynamic loop which can be unsuitable for the strict operational, size, weight, and power demands of wearable or portable devices.

Moreover, conventional water generation device systems typically have a large footprint (e.g., 25 to 200 sq. ft.). The size and complexity of such conventional water generation device systems may stem from a need to handle multiple airflow and liquid desiccant loops, along with heat exchange mechanisms and containment solutions. Such complexities can necessitate the aforementioned footprint and cause various inefficiencies relating to power management of system subcomponents.

Additionally, traditional liquid desiccants can exhibit slow sorption kinetics and isotherms that lose efficacy below moderate RH values. While high humidity and high ambient temperature conditions could allow for less than 300 Wh/liter performance from these large-scale systems, performance can scale to 1500 Wh/L when at more average conditions, and up to 5000 Wh/L when at arid conditions. Without being bound by any particular theory, the fundamental thermodynamics of conventional water generation device systems can result in poorer performance (i.e., less efficient water production) at moderate or poor conditions, thereby dramatically limiting their efficacy and applicability.

Accordingly, there exists a need for wearable, individual, small-scale, portable and/or field-deployable systems and methods for producing liquid water from ambient air or atmospheric air using an inexpensive and reliable approach that maximize the water production rate and/or efficiency.

SUMMARY

A wearable water generation device is provided herein. The wearable water generation device may comprise a sorbent chamber comprising a sorbent material to capture water vapor from ambient air during a load cycle, the sorbent material being configured to absorb thermal energy, a vacuum pump configured to produce a reduced pressure condition within the sorbent chamber, thereby desorbing water from the sorbent material during a release cycle, wherein the reduced pressure condition increases a ratio of vapor pressure of water captured by the sorbent material to water vapor partial pressure in the sorbent chamber, and a condenser for producing liquid water from the desorbed water vapor received from the vacuum pump.

In various embodiments, the sorbent material is configured to absorb thermal energy from a wearer of the atmospheric water generation device. In various embodiments, the sorbent material is configured to absorb thermal energy from solar radiation impinging on the atmospheric water generation device. In various embodiments, the wearable water generation device further comprises a fan configured to cool the condenser. In various embodiments, the vacuum pump discharges the desorbed water vapor as steam at atmospheric pressure. In various embodiments, the vacuum pump discharges the desorbed water vapor to a higher pressure than atmospheric pressure.

In various embodiments, the wearable water generation device further comprises a compressor in combination with the vacuum pump, and the desorbed water vapor is discharged from the sorbent chamber to a higher pressure than atmospheric pressure. In various embodiments, the wearable water generation device is configured to operate in an open loop thermodynamic cycle. In various embodiments, an outlet of the vacuum pump is configured to exchange heat from emitted water vapor therefrom to the sorbent chamber, thereby increasing at least one of a rate and a vapor pressure of water vapor desorbed from the sorbent material.

In various embodiments, the sorbent material comprises an ionic liquid. In various embodiments, the sorbent material comprises a solvent-less ionic liquid epoxy resin. In various embodiments, the sorbent material comprises an ionic liquid entrained into a porous solid. In various embodiments, the sorbent material comprises a metal-organic framework. In various embodiments, the wearable water generation device is configured to exchange heat from the vacuum pump to the sorbent material. In various embodiments, the wearable water generation device is configured to exchange heat from the condenser to the sorbent material such that a power requirement of the vacuum pump is reduced, thereby increasing a coefficient of performance. In various embodiments, the sorbent chamber comprises an inlet for inputting a gas leak during the release cycle. In various embodiments, the carrier gas leak comprises ambient air.

In various embodiments, the wearable water generation device further comprising one or more sensors, and a controller coupled to the one or more sensors and the vacuum pump, the controller being configured to maximize a water production rate in the condenser by adjusting the reduced pressure condition during a release time. In various embodiments, the wearable water generation device further comprises a controller configured to maximize a water production rate of the condenser by maintaining the reduced pressure condition below a predetermined setpoint in the sorbent chamber. In various embodiments, the controller maintains the reduced pressure condition below the predetermined setpoint in the sorbent chamber by adjusting power input to the vacuum pump. In various embodiments, the controller is further configured to adjust a flow rate of a gas leak to maintain the reduced pressure condition in the sorbent chamber.

In various embodiments, a method for operating a wearable water generation device is provided herein. In various embodiments, the method comprises capturing water vapor, by a sorbent material in a sorbent chamber, from ambient air during a load cycle, forming a reduced pressure condition in the sorbent chamber during a release cycle, desorbing water from the sorbent material during the release cycle during the release cycle, and condensing water vapor output from the sorbent chamber into liquid water during the release cycle. In various embodiments, the load cycle and the release cycle operate in an open loop thermodynamic cycle. In various embodiments, the method further comprises inputting a gas leak into the sorbent chamber during the release cycle. In various embodiments, capturing water vapor comprises inputting ambient air into the sorbent chamber of the wearable water generation device. In various embodiments, desorbing water from the sorbent material during the release cycle comprises exposing the sorbent material to a low grade heat source. In various embodiments, the low grade heat source includes thermal energy from a wearer of the atmospheric water generation device. In various embodiments, the low grade heat source includes passive ambient heat, solar energy, or a combination thereof.

In various embodiments, forming the reduced pressure condition comprises adjusting the reduced pressure condition by adjusting a vacuum pump rate. In various embodiments, forming the reduced pressure condition comprises adjusting the reduced pressure condition by adjusting a flow rate of a carrier gas into the sorbent chamber.

In various embodiments, the method further comprises determining a wearer's body condition; and, adjusting the reduced pressure condition based on the determined body condition. In various embodiments, the wearer's body condition is the wearer's body heat, temperature, metabolic rate, or a combination thereof. In various embodiments, the method further comprises determining the wearer's body condition has increased above a predetermined threshold, and reducing an amount of energy input to form the reduced pressure condition based on the determined wearer's body condition. In various embodiments, the method further comprises determining the wearers body condition has decreased below a predetermined threshold, and reducing a pressure within the sorbent chamber based on the determined wearer's body condition. In various embodiments, the method further comprises determining an amount of water in the sorbent material; and in response, determining a sorbent chamber pressure setpoint based on the determined amount of water.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

FIG. 8(a) shows a Tetraamino aromatic crosslinker with bromide counter ions and FIG. 8(b) shows a Di-epoxide imidazolium dodecyl sulfate, according to an embodiment;

DETAILED DESCRIPTION

Figure 1:
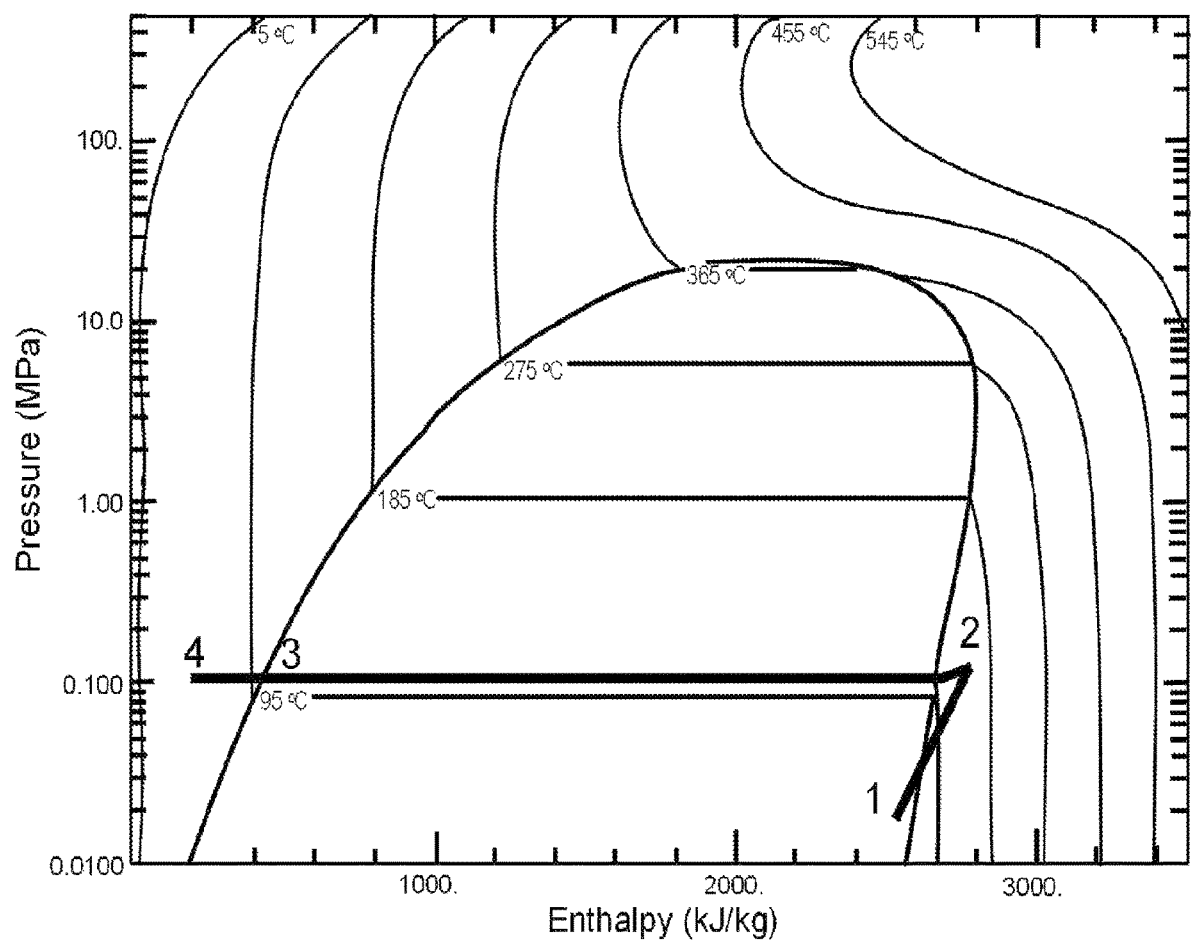
FIG. 1 depicts a vapor cycle on water vapor p-h diagram including states (1) adsorbed vapor on a sorbent material is subjected to a reduced atmospheric pressure via a vacuum pump, driving vapor pressure gradient and desorbing water vapor; state (2) a pump outlet of water vapor produced from the sorbent material (e.g. at least partially steam at atmospheric conditions), which is then cooled via the condenser to liquid phase (3), and continually rejecting heat to ambient conditions (4), according to an embodiment.

This disclosure includes embodiments of wearable, portable, individual, small-scale, and/or field-deployable systems and methods, such as, for example, for generating liquid water from air. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10%. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

As used in this disclosure, the terms "sorption," "adsorption," "absorption," and the like, may be interchangeable. While it is generally appreciated that absorption is a bulk phenomenon and adsorption is a surface-based phenomenon, the hygroscopic materials, desiccants and/or sorption mediums of the present disclosure may capture water vapor by adsorption, absorption, or a combination thereof.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

A wearable, portable, individual and/or small-scale device for efficient atmospheric water extraction or generation is described herein. In one example, a wearable water generation device can support the total water needs for an individual person or wearer (e.g. a fielded warfighter). A combination of advanced sorbent materials, system operational approach, thermodynamic cycle and other features enabling integration into a field-deployable device are described herein. As used herein, a wearable atmospheric water generation device refers to a water generation device that can be wearable, portable, individual, small-scale, and/or field-deployable; reference to one of these features should not be understood to exclude the others.

The wearable water generation device can utilize ultra-low grade heat (or low temperature, e.g. <60° C. or <40° C.) sources, such as ambient heat, body heat and/or solar energy, for efficient production of liquid water from air, enabling a small and/or wearable device that will produce individual or personal quantities of water under aggressive environmental conditions (e.g. low ambient relative humidity) and/or with no or minimal available external power. The wearable water generation device can use lower-grade heat from exogenous sources for entirely off-grid applications by integrating distinct sorbent materials systems, controlled thermodynamic cycles, and/or embedded software and controls.

The wearable water generation device can be configured to function by cycling sorbent materials described herein between an atmospheric pressure condition and a low or reduced pressure condition. The sorbent materials of the wearable water generation device described herein can adsorb water vapor under conditions as low as 3% or 10% RH, can have little or no vapor pressure themselves, can have high thermal conductivity, and can be minimally vulnerable to adsorption site poisoning from atmospheric constituents. The wearable water generation device itself can comprise a highly efficient and/or small-scale vacuum pump that can achieve lower pressures than the vapor-pressure of water adsorbed and/or absorbed into the hygroscopic or sorbent materials of the device.

The highly efficient wearable water generation devices, systems and methods described herein and their associated features represent a different approach to enable a new paradigm in infrastructure-free potable water production from air. In various embodiments, the functional surface area for a hygroscopic, sorbent or desiccant material of a wearable water generation device—for both water uptake and heat exchange purposes—is designed and constructed for operation in a small volume water production range of an individual wearer (e.g., in the range of 1.5 L). In various embodiments, one or more sorbent materials and/or thermodynamic cycles are defined for very low-grade heat sources (e.g., heat from of a human body, less than about 40° C., passive ambient heating and/or solar radiation impinging on the device, etc.), which may be useful for water vapor desorption. In various embodiments, by applying vacuum and/or a controlled, reduced pressure condition during a desorption stage of a water generation cycle, the temperatures to extract water vapor can be lowered, and the efficiency of the device can be increased.

In various embodiments, a particular sorbent material set, its production or assembly, and a defined thermodynamic cycle are integrated into a field-deployable or wearable water generation device. For ease of description, a thermal cycle capable of the desired energy conversion rates is first described below, and then followed by a description of the desired sorbent material properties, leading into the integrated sorbent material features.

Wearable Water Generation Device Operational or Thermodynamic Cycle

Various wearable water generation devices described herein provide an approach to atmospheric water extraction with implementation of an open loop thermodynamic cycle employing water vapor as the working gas. Various wearable water generation devices described herein can be particularly suited for wearable, field-deployable or expeditionary applications. For ease of description, the operational cycle is introduced first to elucidate the basis for incorporating the possible sorbent materials enabling operation across a wide range of environmental conditions.

The wearable water generation device and methods described herein can be implemented as an open loop thermodynamic cycle employing water as a working fluid, thereby dramatically increasing the effective coefficient of performance (COP) of extracting water vapor from ambient air. According to an embodiment, FIG. 1 illustrates an exemplary open loop vapor cycle on a pressure-enthalpy diagram in which the full open loop cycle from states 4 to 1 (as represented by the thick black line) does not directly connect (i.e., an open loop cycle). In various embodiments, the wearable water generation device can be configured to continually reject heat to ambient conditions during water desorption, rather than reintroducing it to a sorbent material disposed in a sorbent chamber of the wearable water generation device. The sorbent material can be first exposed to ambient air as the source of water communicated into the wearable water generation device. Then, at state 1, the moisture laden sorbent material can be brought under a reduced atmosphere condition (e.g., less than 1 atm) to reduce the partial pressure of water vapor over the sorbent material. In various embodiments, the wearable water generation device, for example via a controller (e.g. PCB, wireless, etc.), can retain the pressure of the internal system (e.g., the sorbent-containing chamber) below a setpoint based on the properties of the sorbent material and/or one or more available low-grade heat sources. For example, in various embodiments, the controller can determine whether a temperature of a wearer of the wearable water generation device is above, below, or between a predetermined threshold (e.g., between 35-40° C.) and in response, maintain the pressure in the sorbent chamber below or between a predetermined threshold (e.g., less than 1 atm, less than about 0.8 atm, between 0.1 and 0.8 atm, etc.).

In various embodiments, the driving force for vapor desorption (e.g., from the sorbent material in the sorbent chamber of the wearable water generation device), J, is proportional to the difference between the equilibrated vapor pressure of water on the sorbent material $P_v$ and the partial pressure of water vapor in the atmosphere $P_p$ surrounding the device sorbent material (e.g., within the sorbent chamber of the wearable water generation device) as shown in Equation (1).

$$J \sim P_v(T) - P_p \quad (1)$$

Consistent with Equation (1), $P_v$ increases with increasing heat flux and/or temperature applied to the sorbent material (e.g., via heat transfer from the wearer's body to the sorbent material), while $P_p$ decreases with decreasing atmospheric pressure (e.g., in the sorbent chamber of the wearable water generation device). In various embodiments, heat flux and/or atmospheric pressure in the sorbent chamber of the wearable water generation device can be further controlled by the wearable water generation device (e.g. via a controller) to drive the value of J in favor of vapor desorption. In various embodiments, the controller can determine whether a wearer's body heat, temperature and/or metabolic rate has increased above a predetermined threshold, and in response, reduce the amount of energy (e.g., from an onboard device battery) directed to an onboard pumping device for reducing pressure within the sorbent chamber. In various embodiments, the controller can determine that a wearer's body heat, temperature or metabolic rate has decreased below a predetermined threshold, and in response, activate an onboard pumping device to reduce the pressure within the sorbent chamber. In various embodiments, the controller can determine, estimate and/or track an amount or quantity of water held by the sorbent material (e.g., via a conservation calculation of desorbed-to-absorbed mass based on known sorbent material properties and pressures and/or temperatures) and in response, determine a sorbent chamber pressure setpoint; for example, in various embodiments, the controller may decrease chamber pressure in response to a reduction in the wearer's body heat and/or temperature, and/or increase chamber pressure in response to an increase in the wearer's body heat, body temperature, etc.).

Figure 2:
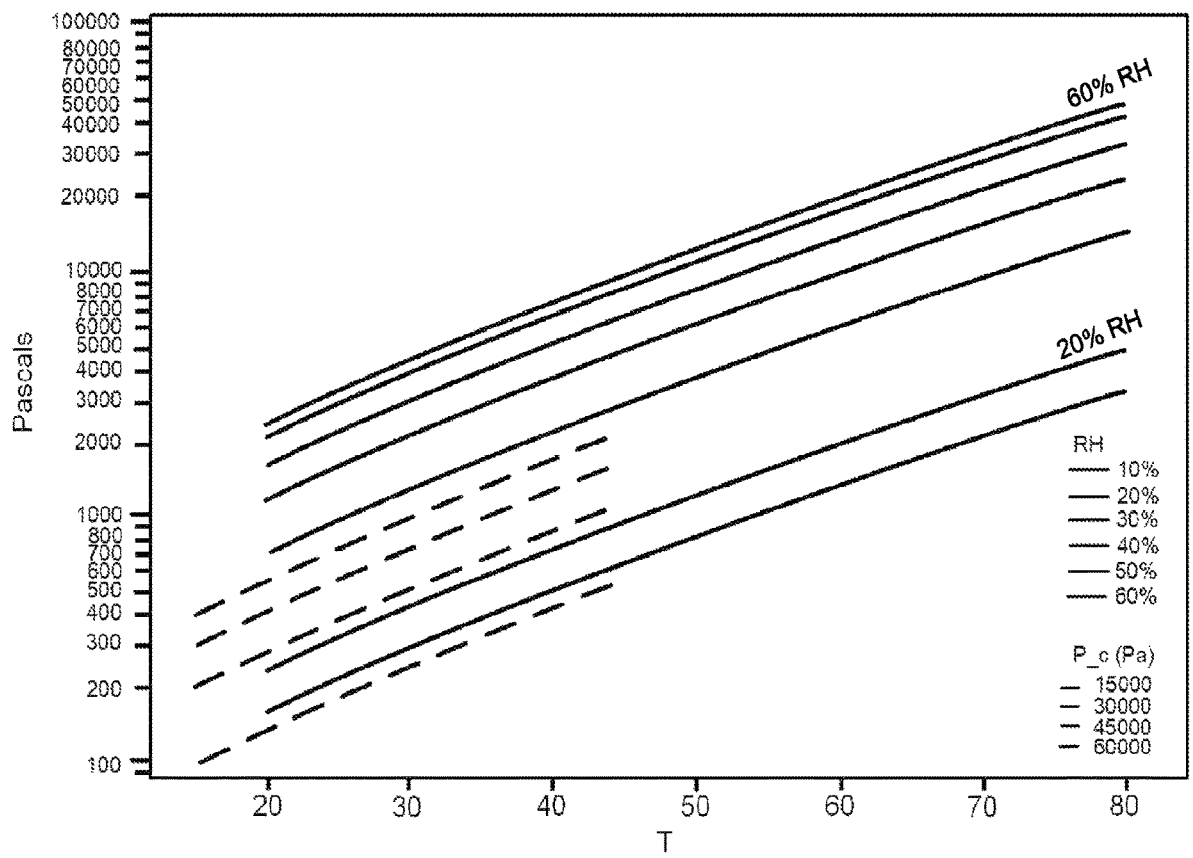
FIG. 2 depicts water vapor pressure on the sorbent material at the equilibrated Relative Humidity (RH) levels (solid lines) compared to vacuum chamber pressure (P_c) applied by a pump, both as a function of material/chamber temperature, according to an embodiment.

By way of illustration, FIG. 2 depicts gradients between the equivalent vapor pressure over the sorbent material (at different RH loading conditions indicated in solid lines) and sorbent chamber pressure P_c indicated by dashed lines (of which the partial pressure of water vapor in the chamber is a fraction of). As shown in FIG. 2, at less than about 20% RH, the sorbent chamber vacuum can generate a driving force for water desorption (as demonstrated by the difference between the 20% RH curve and the 15 kPa sorbent chamber pressure curve). In various embodiments, any low heat flux grade (e.g., heat source at low temperature from the wearer's body) increases this driving force for water desorption. As will be described in more detail below, in various embodiments, the controller can determine an operational setpoint for driving water vapor desorption (and thus, water generation) by controlling the difference between the equivalent vapor pressure of the sorbent material in the sorbent chamber and the sorbent chamber pressure.

In various embodiments, desorbed vapor can be compressed back up to atmospheric pressure, or above atmospheric pressure, via a vacuum pump operatively coupled to, and/or configured as a component of, the wearable water generation device. In some implementations, the wearable water generation device can an comprise a compressor unit downstream of the vacuum pump and/or in advance of a condenser. In various embodiments, the pump's output can be saturated and/or supersaturated steam, which is then cooled down via the condenser to the water saturation line. Consistent with FIG. 2, in various embodiments, a COP of an open loop cycle as described herein can be about 9 (wherein about means+/−2), such that a liter of water can be produced via a 73 Wh energy input, and respectively, greater than 5 liters in a 24 hour period using 400 Wh. In various embodiments, additional energy inputs that modulate the material equivalent vapor pressure in equation (1) can help to further improve COP. For example, heat exchange from the condenser to the sorbent material can alleviate the pump requirement from about 30 to about 45 kPa, increasing the COP to about 11.

Figure 3:
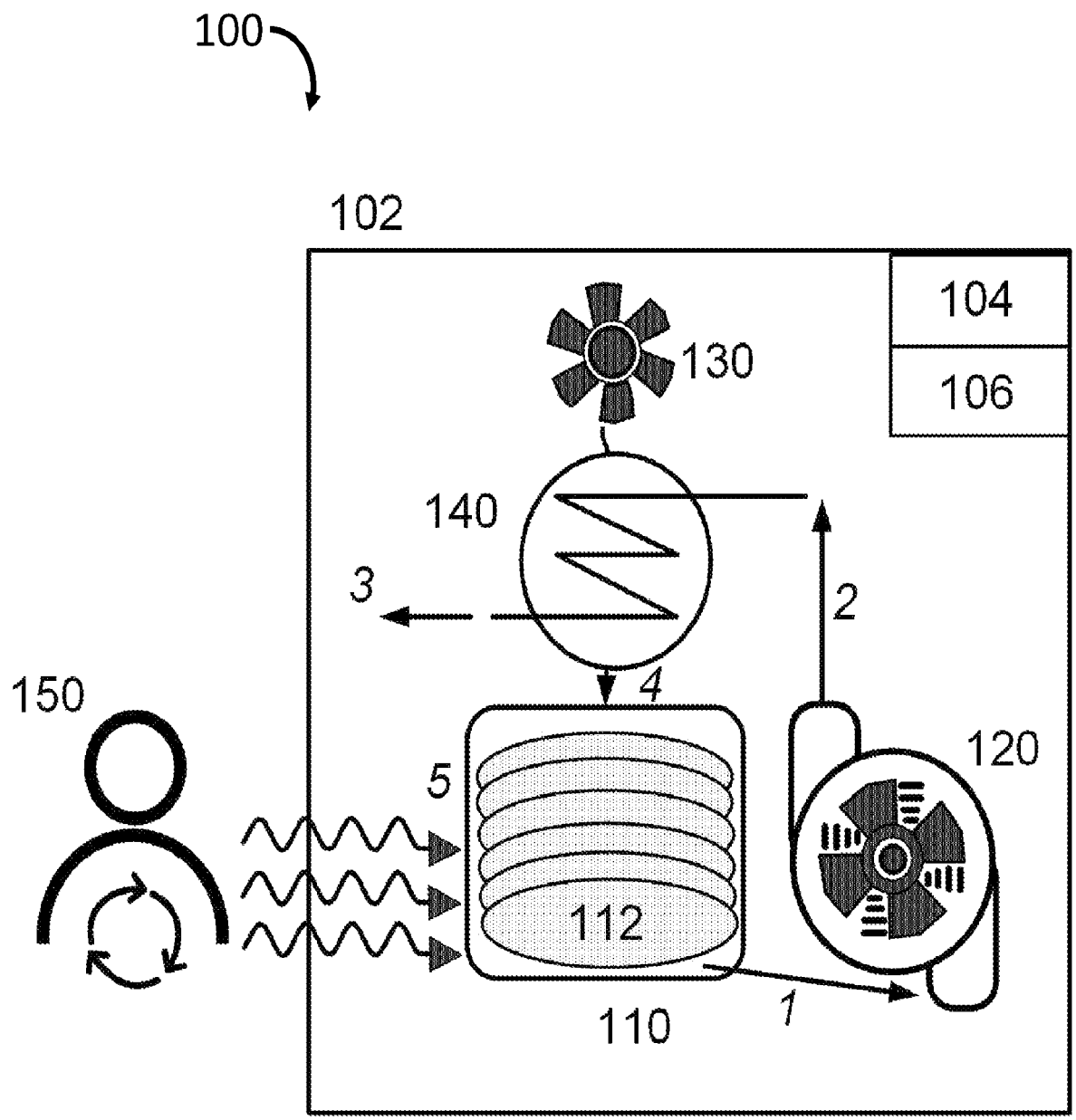
FIG. 3 depicts an atmospheric water extractor (AWE) and cycling operational scheme, according to an embodiment.

FIG. 3 shows a wearable water generation device 100 and exemplary cycling scheme (shown by arrows), in accordance with various embodiments. Wearable water generation device 100 can comprise a device housing 102 coupled to or worn by an individual 150, a sorbent chamber 110 comprising a sorbent material 112, a vacuum pump or pressure reducing component 120 operatively coupled to the sorbent chamber 110, a fan or air blower 130 and/or a condenser 140. Components and features of FIG. 3 are not drawn to scale, but rather illustrated for ease of description. In various embodiments, sorbent chamber 110 can be sealable via valves and/or other mechanisms activated during a release cycle of wearable water generation device 100. The vacuum pump 120 can be configured to desorb vapor from the sorbent chamber 110 and compress it to atmospheric pressure (e.g., steam or at least partially steam), as indicated from cycle portion 1 to cycle portion 2. In some implementations, a fan 130 cools the condenser 140 to improve condensation and/or production of liquid water, as indicated from cycle portion 2 to cycle portion 3. At sorbent chamber 110, adsorbed vapor can undergo the open loop thermodynamic cycle described above and in relation to FIG. 1. In various embodiments, the open loop thermodynamic cycle can be controlled for liquid water production as described herein a controller 104.

Figure 4:
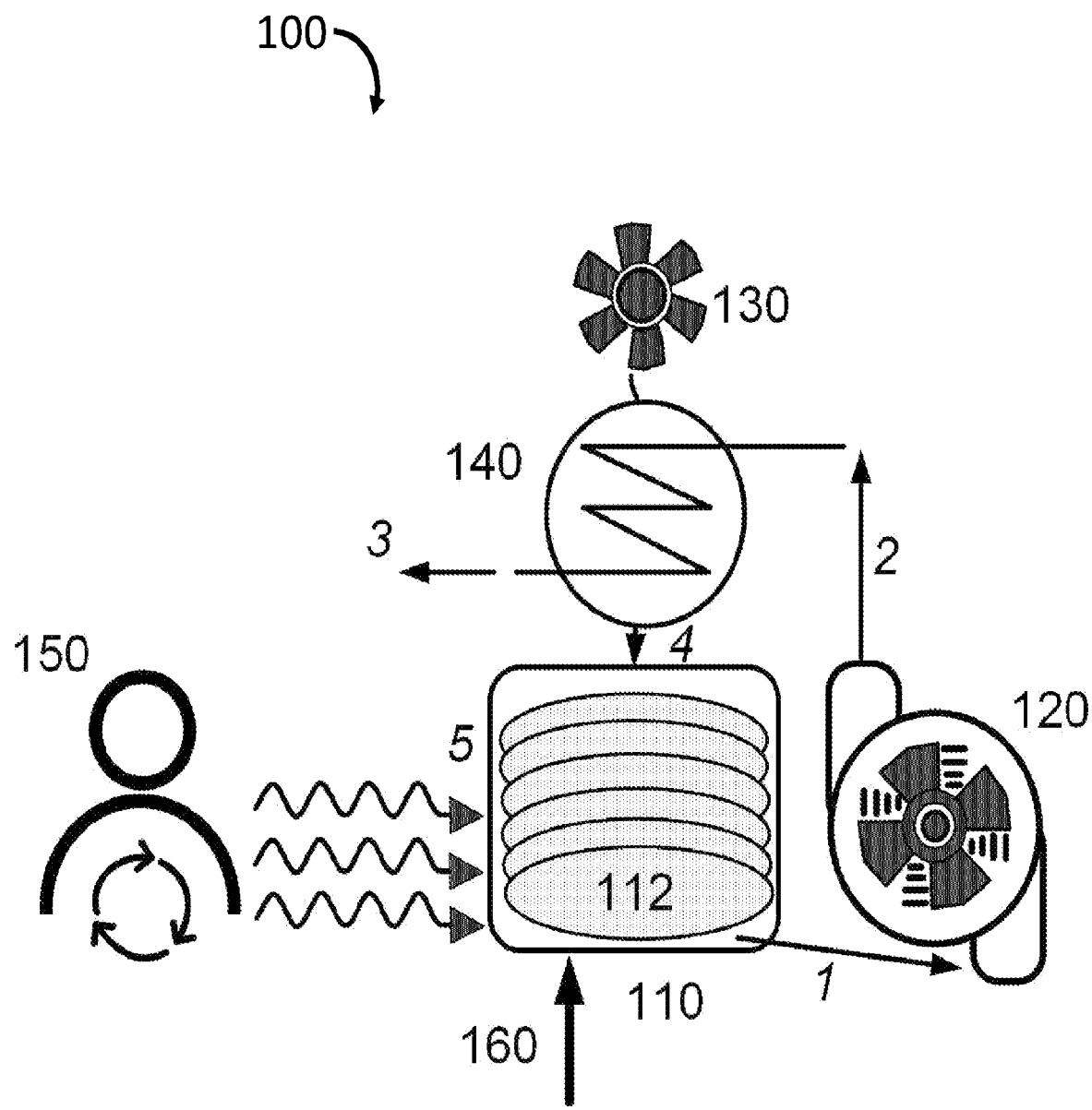
FIG. 4 depicts an atmospheric water extractor (AWE) and cycling operational scheme, according to an embodiment.

FIG. 4 shows a wearable water generation device 100 and exemplary cycling scheme (shown by arrows), in accordance with various embodiments. In various embodiments, sorbent chamber 110 can be placed under vacuum or negative pressure (e.g., via vacuum pump 120). In various embodiments, a gas leak 160 (e.g., ambient air input to sorbent chamber 110 via a valve) can be introduced into interior volume of sorbent chamber 110. The numerical indicators used to refer to components in FIG. 4 are similar to those used to refer to components or features in FIG. 3 above, and while some components may not be depicted in FIG. 4 for ease of description, some or all can be present in the system of FIG. 4 in various implementations. In some implementations, the gas leak 160 can be heated before and/or during input to sorbent chamber 110 by any desirable heating mechanism or source (e.g., via low grade body heat of wearer 150). In some implementations, heat can be transferred from the expanded water vapor output from the sorbent chamber 110 indicated at cycle portion 1, at or above atmospheric pressure, to the gas leak 160 entering the sorbent chamber 110 via a heat exchange mechanism or configuration. In this way, efficient cooling and condensation of the water vapor output from sorbent chamber 110 and, conversely, heating and drying of the gas leak 160 can be facilitated. Without being bound by any particular theory, a mixture of fluids from the sorbent material-respired water vapor and gas leak may produce an elevated pressure within sorbent chamber 110, resulting in a rapid phase change of the water vapor into liquid water, for example once the mixture is moved to a higher pressure condition via the vacuum pump 120.

Additional approaches and details for optimizing production of liquid water are described in U.S. application Ser. No. 16/657,935 filed on Oct. 18, 2019, which is entitled "Systems and methods for generating liquid water using highly efficient techniques that optimize production."

In various embodiments, metabolic heat from the wearer of a wearable water generation device, and latent heat of condensation carried by the airflow from the condenser, can be exchanged with the sorbent chamber and/or sorbent material, further driving desorption kinetics. In addition to bringing the sorbent under a reduced atmospheric pressure, the sorbent material and sorbent chamber can also be configured to receive low grade heat from (i) ambient conditions, (ii) the wearer's metabolism such as body contact or respiratory heat exchange, (iii) extracted heat of condensation used as cogeneration heat from the condenser, (iv) extracted electrical waste heat from any components in use such as, for example, the vacuum pump, and (v) solar thermal energy. In various embodiments, solar thermal energy utilized by a wearable water generation device may be passive and not a direct consideration for wearers to position themselves for peak solar activity.

The open loop thermodynamic cycle described herein can be implemented for wearable or portable water production based on control of the reduced pressure condition, sorbent chamber controlled gas leak and/or temporal dynamics of the reduced pressure condition. Additionally, the properties of the sorbent material and its physical configuration integrated in the wearable water generation device can be configured for absorption and conduction of thermal energy from passive low-grade heat sources.

In various embodiments, a reduced pressure condition can be formed within the sorbent chamber 110 such that the reduced pressure condition increases a ratio of the vapor pressure of water captured by or relative to the sorbent material 112 to the water vapor partial pressure in the sorbent chamber 110. In some implementations, a reduced pressure condition can be formed within the sorbent chamber 110 such that the reduced pressure condition increases a ratio of the vapor pressure of water captured by the sorbent material to the total pressure in the sorbent chamber 110. Water vapor pressure or equilibrium vapor pressure of water should be understood herein to mean the pressure exerted by water vapor in thermodynamic equilibrium with its condensed phase disposed in the sorbent material, or relative to the sorbent material, at a given temperature. As used herein, water vapor partial pressure in the sorbent chamber can be defined by the pressure that would be exerted by water vapor in a gas mixture if it alone occupied the sorbent chamber, and total pressure in the sorbent chamber can be defined as the sum of the partial pressures of all gases in the mixture.

In various embodiments, the reduced pressure condition can be controlled or optimized, dynamically or otherwise, by increasing the ratio of water vapor pressure captured by the sorbent material to the water vapor partial pressure in the sorbent chamber. In various embodiments, the reduced pressure condition can be optimized by increasing the ratio of water vapor pressure captured by the sorbent material to the total pressure of gases in the sorbent chamber. In an exemplary control scheme, the reduced pressure condition can be configured such that the water vapor pressure captured by the sorbent material is maintained higher than the water vapor partial pressure in the chamber volume.

Various approaches can be employed to control and/or optimize the reduced pressure condition within the sorbent chamber so as to drive the water vapor captured by the sorbent material during a load time towards vapor pressure saturation during a release time. With the sorbent chamber volume under vacuum or negative pressure relative to ambient pressure, any passive heat or thermal energy source (e.g. wearer's body heat) can be introduced into the sorbent chamber volume so as to heat the sorbent material. In some implementations, the sorbent material can absorb waste heat generated from operation of one or more components of the wearable water generation device and/or its surroundings.

In various implementations, the wearable water generation device sorbent material can be passively loaded with atmospheric water, for example according to the diurnal cycle. As another operation example, water generation device valves can be actuated in an alternating manner according to the diurnal cycle and/or operational setpoints to seal the device housing volume during a release time and open during a load time.

In various embodiments, the wearable water generation device can include a controller (e.g. controller 104) to maximize the production of liquid water at the condenser based on current or forecast ambient conditions (e.g. solar insolation, ambient temperature, ambient humidity, etc.), current or forecast system properties (e.g. ambient and/or wearer temperatures) and so on.

In various embodiments, wearable water generation device 100 comprises ancillary energy generation and/or energy storage components 106 (with reference to FIGS. 3 and 4) that are configured to provide power to at least a portion of wearable water generation device 100 (e.g., fan 130, vacuum pump 120, valves, and/or the like). In some examples, wearable water generation device 100 comprises a solar power unit configured to convert solar insolation to electrical power and/or a battery to store power as electrochemical energy and provide power to wearable water generation device 100.

Furthermore, wearable water generation device 100 can use one or more sensors, onboard deterministic and/or machine learning algorithm(s), information regarding the thermodynamics of water vapor, information regarding the properties of the sorbent materials, information regarding the amount of liquid water produced, information regarding the amount of water vapor retained by the sorbent materials to maximize water production at the condenser. In various embodiments, wearable water generation device 100 may comprise such sensors; however, in various embodiments, wearable water generation device 100 may be in communication with such sensors, but such sensors do not comprise a portion of wearable water generation device 100 itself. The wearable water generation device can also comprise one or more indicators (e.g., lights, such as, for example, LEDs), which may be configured to provide information regarding system operation. For example, in some embodiments, indicator lights may be configured to provide information (e.g., visually, for example, to the wearer) that the system is running, that maintenance is recommended, or a component has failed and/or is failing, and/or the like. Any desirable information (including the information described above with reference to indicators) may be transmitted over a communications network (e.g., alone and/or in addition to operation of any indicators).

While the sorbent material can be utilized in a wearable water generation device implemented or operated under an open loop thermodynamic cycle as described above, other implementations or operational approaches employing the sorbent materials described herein are also possible.

Wearable Water Generation Device Sorbent Materials

Figure 5:
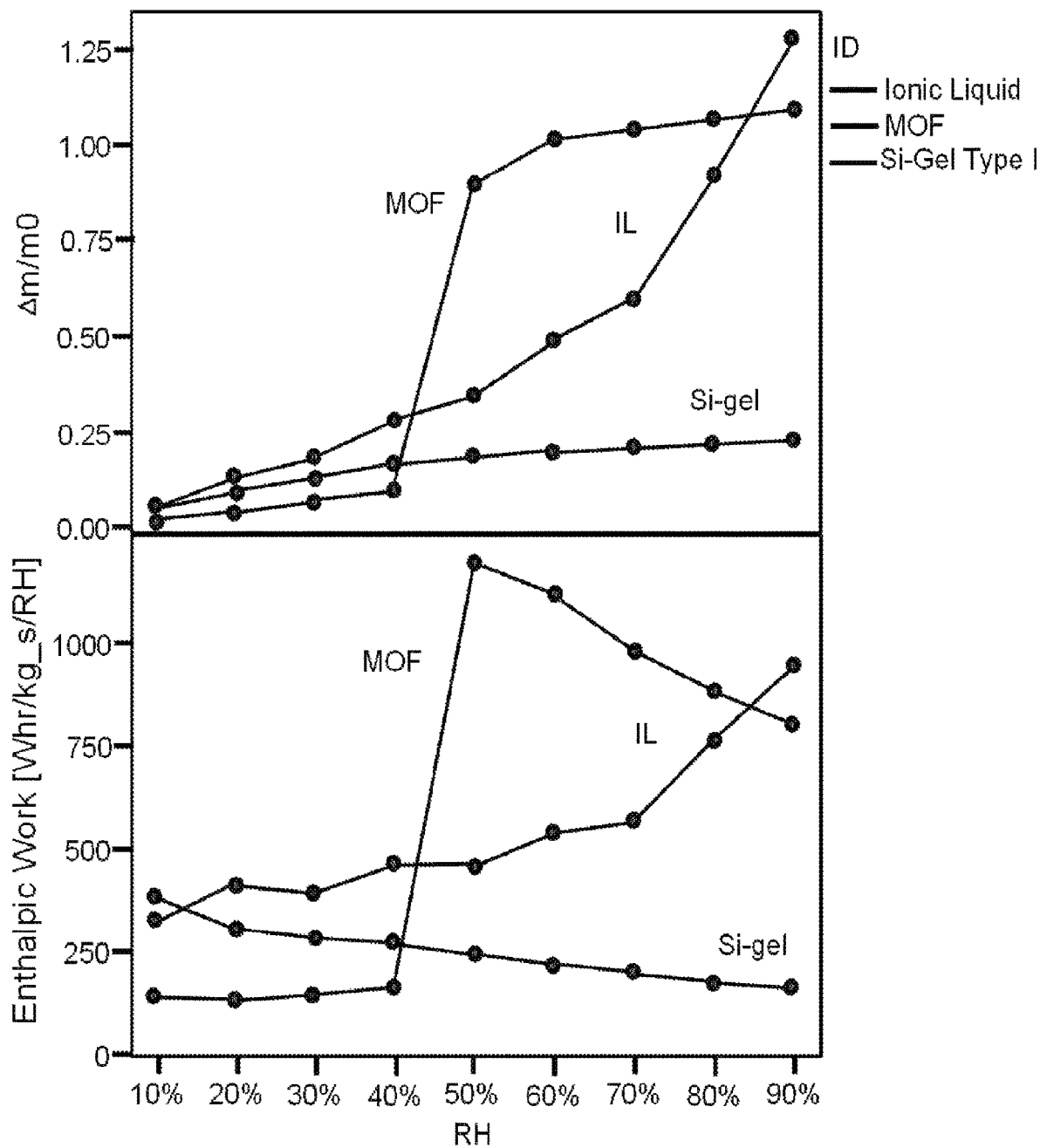
FIG. 5 depicts enthalpic work and water mass uptake across a range of 10-100% RH for three representative classes of sorbent materials: a conventional silica gel (Si-gel), a metal-organic framework (MOF) and an ionic liquid (IL), according to an embodiment.

Turning now to the description of the sorbent materials and features, FIG. 5 depicts enthalpic work and water mass uptake across a range of relative humidity (i.e., 10-100% RH) for three representative classes of sorbent materials: a conventional silica gel (Si-Gel), a metal-organic framework (MOF) and an ionic liquid as indicated in the figure (IL). As shown in FIG. 5, MOF exhibits high water uptake at a mid-range RH; ionic liquids may sustain enthalpic work for efficient water generation across the entire RH range and/or under strict operational demands. In various embodiments, the sorbent material of the wearable water generation device can be selected, defined, and/or configured for high isothermal behavior across a range in relative humidity of at least 10-100% or at least 2-100% RH.

The sorbent material employed in a wearable water generation device can be selected and/or configured for various features, for example, kinetics provided by the high surface area of a hierarchically porous desiccant, the loading potential of an inorganic salt, not being poisoned by other species in the ambient environment, high thermal conductivity, and/or stability under all cycling conditions. Furthermore, the wearable water generation device sorbent material can be selected and/or configured so as to have a stable or high isothermal behavior across a range in relative humidity of at least 10-100% RH or even 3-100% RH (e.g., as shown in FIG. 5).

Ionic liquids (ILs) are a class of materials that can have tunable properties. There are $10^6$ organic ion pairs that are expected to generate so-called low-temperature ionic liquids. These systems can be tuned from hydrophilic to highly hydrophobic, across orders of magnitude of viscosity, can be functionalized to perform various catalytic functions, and can have a high degree of hygroscopicity. Without being bound by any particular theory, the degree of hygroscopicity may be driven by the screening of the charge on the ions of an ionic liquid. Moreover, the isotherm or isothermal behavior of an ionic liquid may be directly tuned, owing to the hardness/softness of those ions, the details of the electronic structure of the particular moieties, and the hydrophobicity and/or shape of the substituents. As described herein, both the degree to which a material may adsorb/absorb water vapor from the environment and also the enthalpic work on that water vapor at various relative humidity conditions may affect water production. In various embodiments, a sorbent material may be selected for its the isotherm behavior across a wide RH range for utilization in a wearable water generation device.

Various approaches can be employed to synthesizing ILs and/or SILERs with a desired set of properties, for example as described in U.S. patent application Ser. No. 13/096,851 filed Apr. 28, 2011 entitled "Metal-air room-temperature ionic liquid electrochemical cell with liquid fuel," U.S. patent application Ser. No. 16/344,751 filed Oct. 24, 2017 entitled "Solvent-less ionic liquid epoxy resin," and International Application Number PCT/US2020/018682 filed Feb. 18, 2020 entitled "Solvent-less ionic liquid epoxy resin."

Despite all of the tunability, and phenomenological range enabled by ILs, they are liquids and, therefore, may lack the surface area to support the kinetics of interest for deployment in a wearable water generation device. As described in further detail below, a class of polymer materials can enable the physio-chemical engineering of ILs, while providing the mechanical properties of highly cross-linked epoxide systems which can be suited for deployment in a wearable water generation device. For purposes of facilitating the description herein, we refer to this class of materials as 'SILER', or Solvent-less Ionic Liquid Epoxy Resins.

Figure 6:
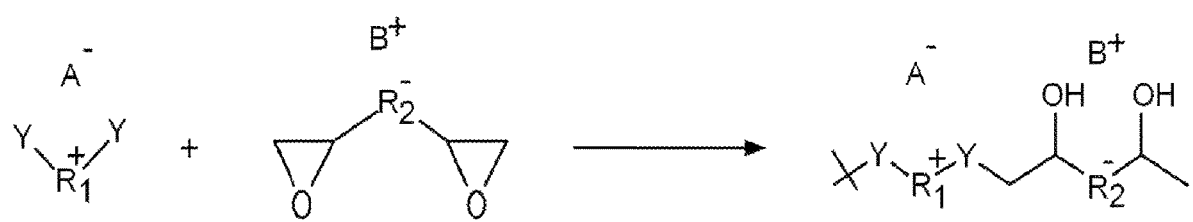
FIG. 6 shows a simplified SILER, or Solvent-less Ionic Liquid Epoxy Resin, polymerization reaction, where both components are ionic liquids, according to an embodiment.

FIG. 6 shows a simplified SILER polymerization reaction in accordance with various embodiments, where both components of a two-part epoxy system are ionic liquids. In this example, the substituents of R1+ can be termed "hardener" chemistries and the ion R2− can have glycidol substituents. The admixture of these two systems can result in a zwitterionic polymer with tunable free volume given the residual ionic liquid A-1B+. In various embodiments, R1 and R2 may also be both anionic or cationic, resulting in an ionomeric polymer. This simplified framework enables the engineering of the final physiochemical, mechanical, and physical properties of the final SILER polymers.

Figures 7A, 7B:
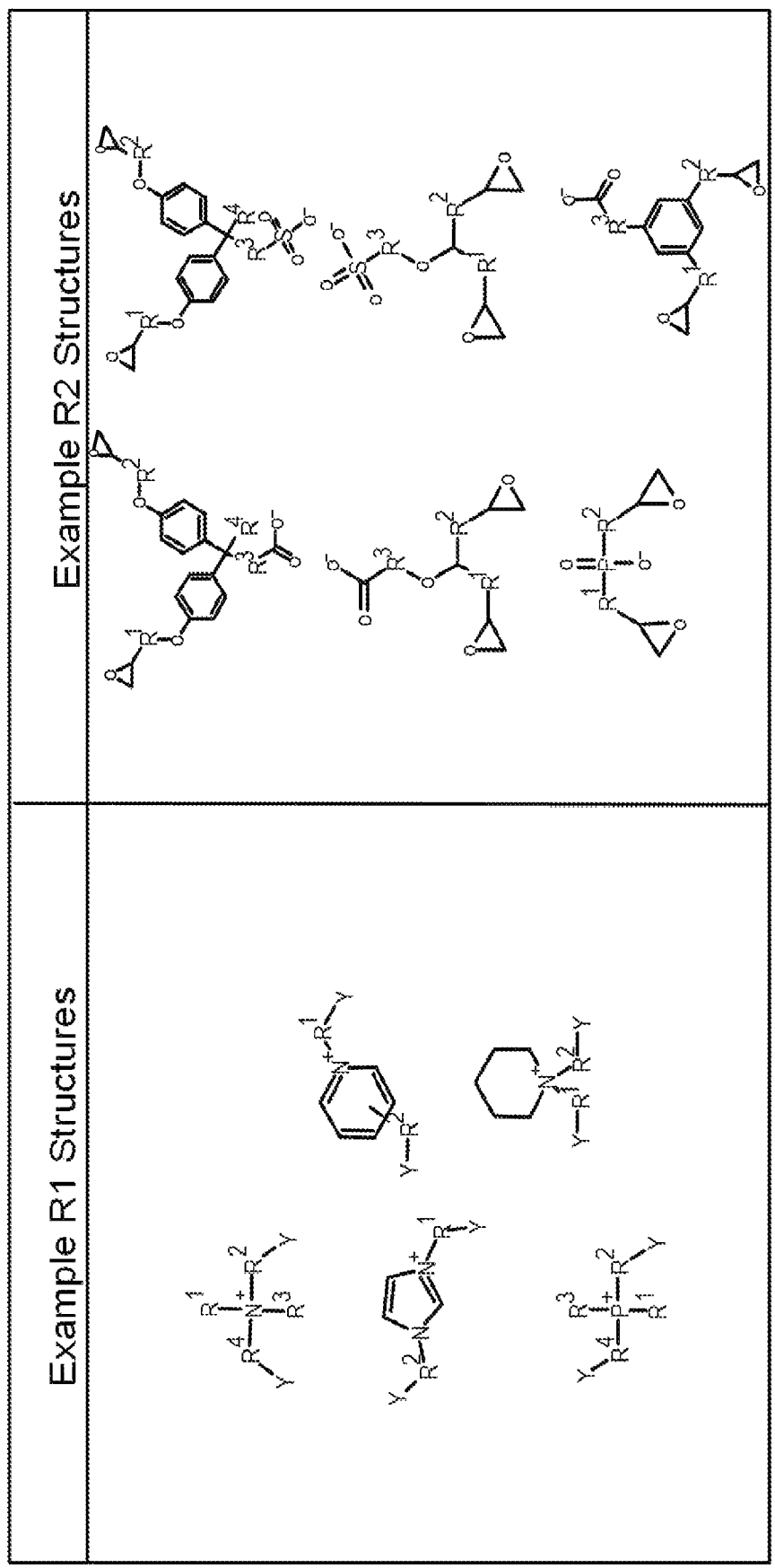
FIGS. 7(a) and 7(b) show exemplary SILER structures, according to an embodiment.

FIGS. 7(a) and 7(b) show a non-limiting set of exemplary SILER IL groups that can be utilized in wearable water generation devices described herein. These SILER structures can have a wide range of substituents and provide a wide range of properties. In various embodiments, the groups R1, R2, R3 and R4 can be selected as any desirable chemical chain. In various embodiments, Y can be a nucleophile including but not limited to —NH2, —SH, —OH, —SeH, —PH2 or other nucleophilic substituents, which can react with an epoxy group with formation of a stable chemical bond, dimer formation as an example of the complete polymerization reaction. Moreover, in various embodiments, Y and epoxy moieties can be exchanged between R1 and R2. In various embodiments, anionic and/or cationic moieties can be any desirable ionic substituent. In one non-limiting example, the resin and the hardener can have different charges; however, in various embodiments, the resin and the hardener comprise counterions of the same sign, which can provide for bound charge polymers.

Figure 8A:
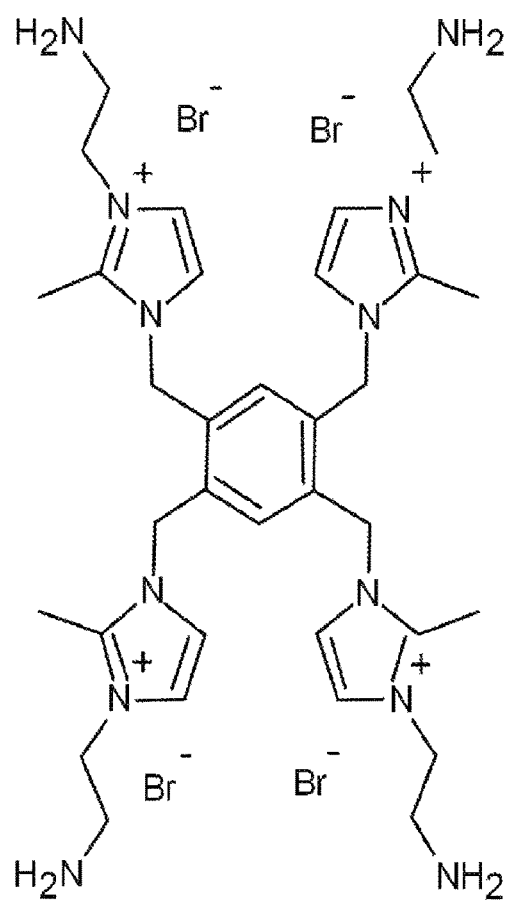
FIGS. 8(a) and 8(b) show exemplary ionic liquid structures.
Figure 8B:
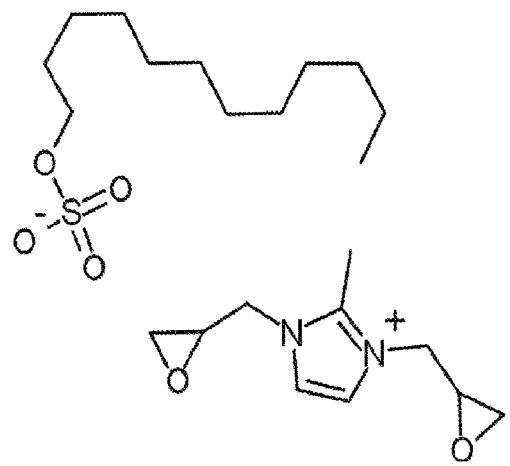

Two exemplary systems are shown in FIG. 8(a), which depicts a tetraamino aromatic crosslinker with bromide counter ions, and in FIG. 8(b), which depicts a di-epoxide imidazolium dodecyl sulfate IL. When these two ionic liquids are mixed, they react to form an ionomer with mechanical properties similar to that of commercially available epoxy polymers, but with large iconicity, and significant hygroscopicity.

Figure 9A:
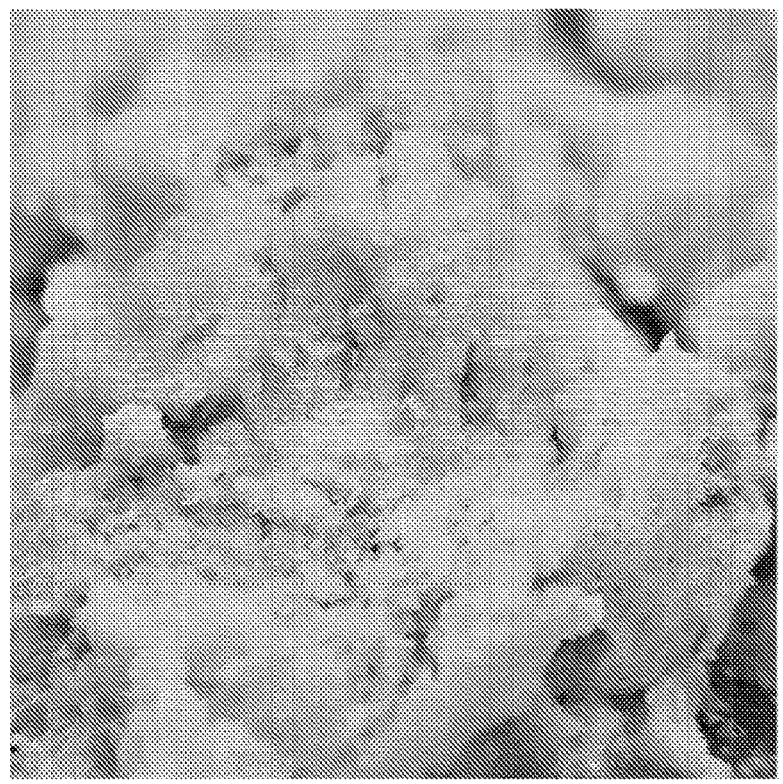
FIGS. 9(a) and 9(b) are images of as-synthesized SILER polymer formed with integral hierarchical pore-former in FIG. 9(a), and micrograph of the same SILER polymer in FIG. 9(b), according to an embodiment.
Figure 9B:
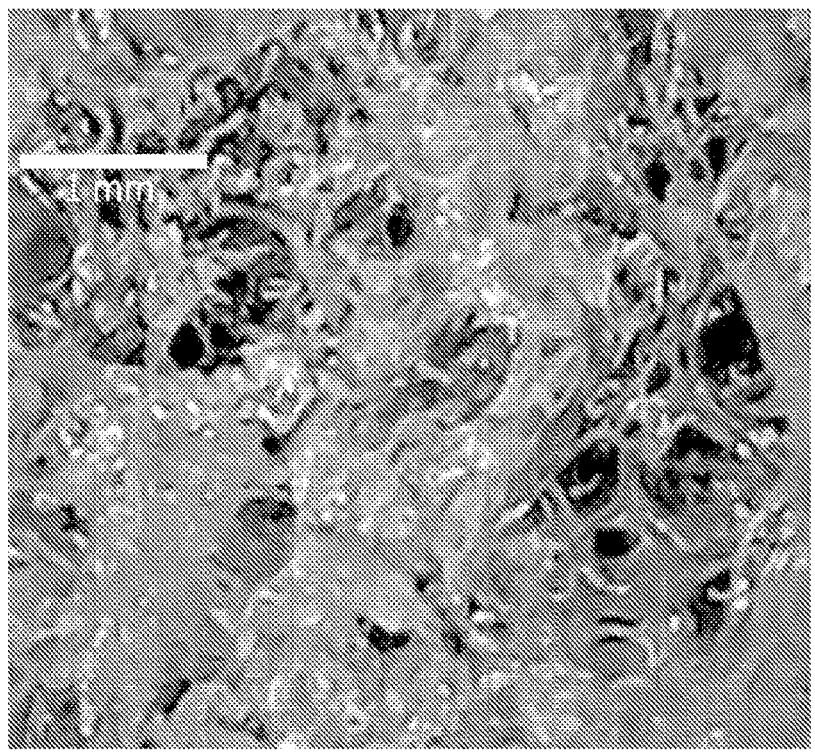

In various implementations, the wearable water generation device can comprise SILER-based ionomeric polymer systems with intrinsically formed regular porosity (e.g.

mesoporosity) upon polymerization of hardener compound and epoxy compound. FIG. 9(a) and FIG. 9(b) show a synthesized SILER polymer, and its porosity structure at both meso and microscale. In particular, FIG. 9(a) depicts an image of as-synthesized porous SILER polymer and FIG. 9(b) shows a micrograph of the same SILER polymer.

Figure 10:
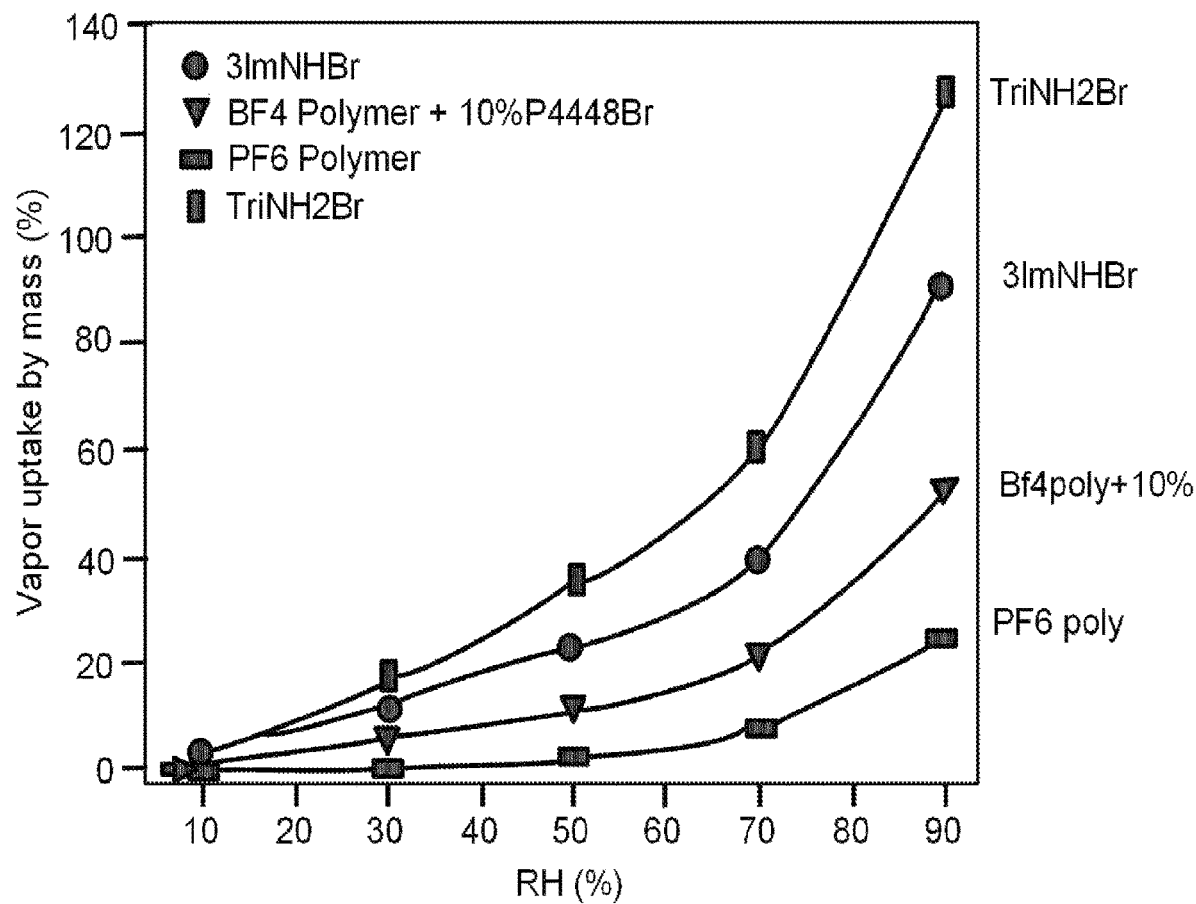
FIG. 10 is a plot of water uptake mass % across a range of relative humidity (RH) % for four SILER-based ionomeric polymer systems, according to an embodiment.

FIG. 10 depicts a plot of an exemplary set of water vapor uptake isotherms (water uptake mass % across a range of % relative humidity) for four exemplary SILER-based ionomeric polymer systems for the sorbent material components: imidazolium bromide hardener (3ImNHBr), linear triethylmethyl ammonium crosslinker (TriNH2Br) and two SILER polymers (10:9:1 resin:hardener:crosslinker:one using the BF4 resin (BF4 polymer+10% P4448Br) and another using the PF6 version of the same (PF6 polymer).

In various embodiments, the sorbent material's water uptake can be tuned by varying the crosslinker, hardener, resin anion, and/or IL w/w % inclusion. There is no appreciable hysteresis in the behavior of the water uptake mass change ($\Delta m/m0$) vs RH plots for all the samples when the direction of the RH sweep is reversed, demonstrating thermodynamic reversibility in the water absorption/desorption process.

As shown in FIG. 10, the linear crosslinker and the imidazolium bromide hardener show maximum water uptake of 127% and 90%, respectively. The polymers exhibit behavior dependent on the resin anion. The polymer with the most hydrophobic anion (PF6) has a maximum $\Delta m/m0$ value of 27% (90% RH) (and not shown, a less hydrophobic (BF4) polymer is close to three times higher with a 76% at the same relative humidity).

Also, as evident in FIG. 10, when an additional ionic liquid (non-reactive) is included in the polymer composition, the overall water affinity of the material can be modified. For example, the presence of 10% w/w of more hydrophobic ionic liquids as P4448Br and P4448Ibu may decrease the water uptake % of BF4 Polymer from 75% at 90% RH to 52-55% at the same conditions.

The sorbent material of the present systems can comprise any desirable medium in any desirable configuration (e.g., such that the hygroscopic material, desiccant or sorption medium is capable of adsorption and desorption of water). In some implementations of wearable water generation devices, the hygroscopic or sorbent material is capable of sorption at a first temperature and/or pressure and desorption at a second temperature and/or pressure. The sorbent material can be provided as a liquid, solid, and/or combinations thereof. The hygroscopic material can be provided as a porous solid impregnated with hygroscopic materials. For additional examples, the sorbent material may include one or more materials selected from the group consisting of: ionic liquids, silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. In some embodiments, the hygroscopic material can be selected and/or configured to avoid sorption of certain molecules (e.g., those molecules that may be poisonous when consumed by a human).

There are several advantages of employing SILER-based sorbent materials in a deployable, highly-efficient wearable water generation device. First, the absorption isotherms in SILER materials are an intrinsic property of the chemistry; because the sorption is driven by charge-screening of the organic salts, it is a bulk property of the material and an absorption process that cannot be poisoned or otherwise retarded as is the case with mesoporous adsorption approaches that rely on clean, molecularly stable surface properties. In addition, the combination of free-volume-driven liquid-like transport kinetics and the ability to create highly cross-linked and stable hierarchically porous structures, means that the kinetics of uptake are fast. The fact that SILER materials may be both synthetically designed to achieve the thermodynamics and engineered achieve the kinetics of interest, makes them suitable for use in wearable water generation device devices. In various embodiments, use of SILER materials are in connection with the open-loop thermodynamic cycle described herein, results in a highly-efficient wearable water generation device.

The present disclosure further provides methods or processes for operating a wearable water generation device for generating liquid water from air. In various embodiments, the wearable water generation device 100 includes a controller 104 configured to control wearable water generation device 100 to maximize the production of liquid water from condenser 140. In various embodiments, controller 104 maximizes the production of liquid water by adjusting the partial pressure of water vapor on or above sorbent material 112 within sorbent chamber 110 with respect to a reduced pressure condition (e.g., as induced by vacuum pump 120).

In various embodiments, methods for operating wearable water generation device 100 include forming a reduced pressure condition by maintaining a pressure in sorbent chamber 110 below the atmospheric pressure surrounding sorbent chamber 110 such that the water vapor captured by sorbent material 112 during a loading operation (i.e., water capture cycle) approaches vapor pressure saturation. In various embodiments, a reduced pressure condition is formed within sorbent chamber 110 such that the reduced pressure condition increases a ratio of the vapor pressure of water captured by or relative to sorbent material 112 to the water vapor partial pressure in the interior volume of sorbent chamber 110. In various embodiments, a reduced pressure condition is formed within the interior volume of sorbent chamber 110 such that the reduced pressure condition increases a ratio of the vapor pressure of water captured by sorbent material 112 to the total pressure in interior volume of sorbent chamber 110. In various embodiments, the reduced pressure condition is a pressure below about 0.8 atm, about 0.7 atm, or about 0.6 atm (wherein about means+/−0.05 atm). In various embodiments, the reduced pressure condition is a pressure below about 0.5 atm (wherein about means+/−0.05 atm). Furthermore, in some embodiments, the reduced pressure condition is between 0.1 and 0.8 atm.

As understood herein, water vapor pressure or equilibrium vapor pressure of water is the pressure exerted by water vapor in thermodynamic equilibrium with its condensed phase disposed in a hygroscopic or sorbent material or relative to a hygroscopic or sorbent material at a given temperature. As understood herein, water vapor partial pressure in the sorbent chamber is the pressure that would be exerted by water vapor in a gas mixture if it alone occupied the sorbent chamber. As understood herein, the total pressure in the interior volume of a sorbent chamber is the sum of the partial pressures of all gases in the mixture.

Figure 11:
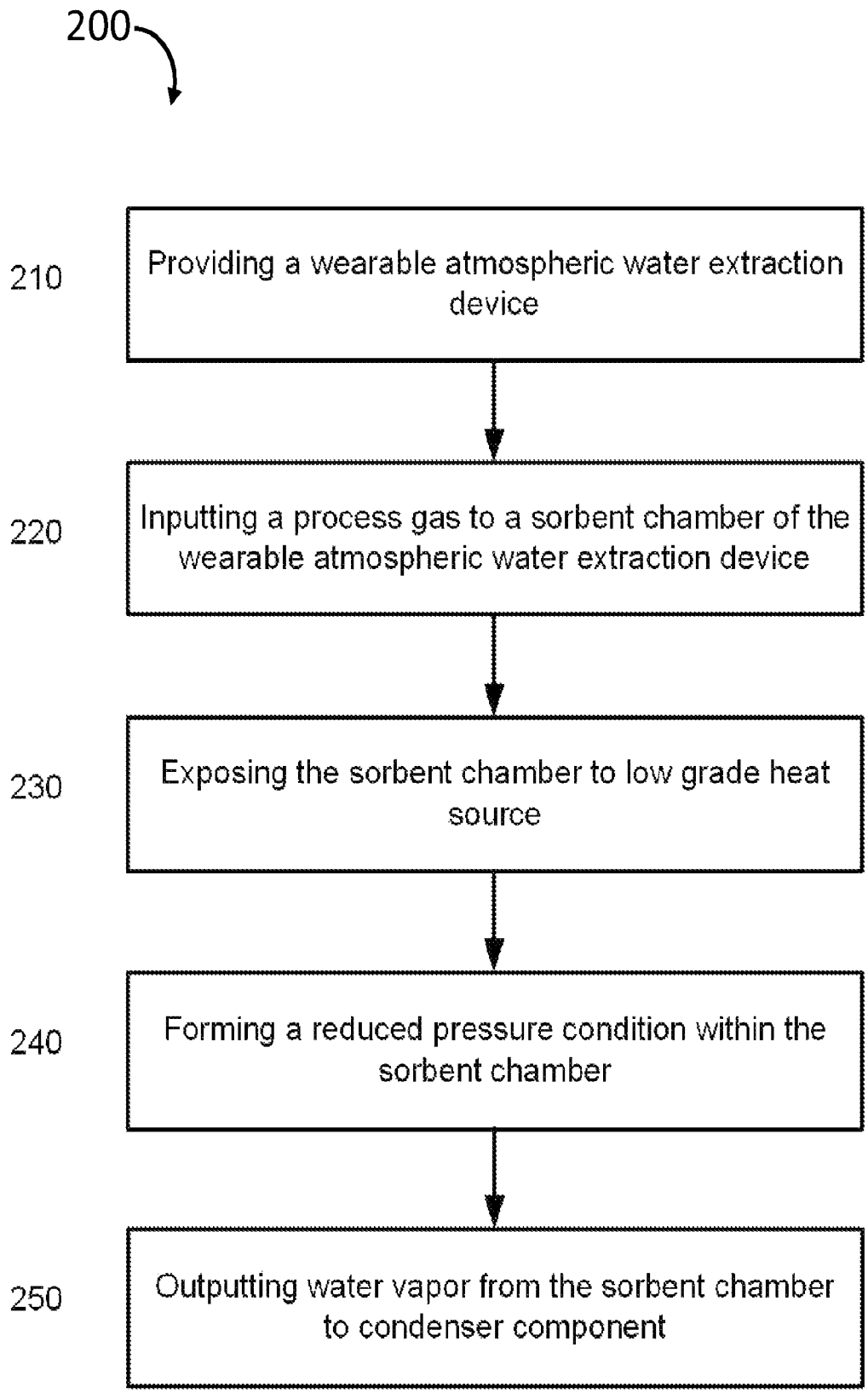
FIG. 11 depicts a flow chart of an exemplary method, according to an embodiment.

FIG. 11 illustrates a flow chart of an exemplary method 200 of producing liquid water from a process gas (e.g., ambient air) in accordance with certain embodiments. Method 200 is merely exemplary and is not limited to the embodiments presented herein. Method 200 can be employed in many different embodiments or examples not specifically depicted or described herein. In some embodiments, the activities of method 200 are performed in the order presented. In other embodiments, the activities of the method 200 can be performed in any other suitable order. In still other embodiments, one or more of the activities in method 200 can be combined, skipped, or omitted. In many embodiments, method 200 may be performed with a device and/or system similar or identical to the wearable water generation device 100 of FIG. 3, FIG. 4 or derivatives thereof.

In various embodiments, method 200 comprises operation or activity 210 of providing a wearable water generation device comprising a sorbent chamber and a sorbent material retained within the sorbent chamber, and a condenser operatively coupled to the interior volume of the sorbent chamber. In some embodiments, the system is similar or identical to the wearable water generation device 100 of FIG. 3 or 4.

In various embodiments, method 200 comprises activity 220 of inputting a process gas (e.g., ambient air) into a sorbent chamber during a load time or cycle (i.e., for water uptake by sorbent material). In various embodiments, method 200 comprises activity 230 of exposing the sorbent chamber to a thermal energy source (e.g., low grade body heat) during a release time or cycle (i.e., for water desorption from sorbent material). In various embodiments, method 200 further comprises activity 240 of forming a reduced pressure condition within the sorbent chamber during a release time or cycle (i.e., for water desorption from sorbent material). In various embodiments, method 200 comprises activity 250 of outputting water vapor from the sorbent chamber to a condenser during the release time. In various embodiments, method 200 comprises repeating any one or more steps of method 200 until a desired volume of liquid water is reached.

Various methods for operating wearable water generation device 100 during release of water vapor into the sorbent chamber comprises retaining the pressure within the sorbent chamber below that of the atmospheric water vapor pressure to which the sorbent material was exposed during a load time. In various embodiments, method 200 comprises activity 240 including activating a pump to evacuate sorbent chamber to a pressure at or below atmospheric pressure. In various embodiments, method 200 can further comprise activity introducing a carrier gas leak (e.g., 160) into sorbent chamber 110 during a release time. For example, in some embodiments, while interior volume of sorbent chamber 110 is under a negative pressure (e.g., relative to atmospheric pressure), a carrier gas from the atmosphere (e.g. via an inlet at 160) or elsewhere, is input into sorbent chamber 110 during the release time. Without wishing to be to be bound by any particular theory, the hygroscopic material-respired water vapor and leak carrier gas mixture may produce an elevated total pressure within sorbent chamber 110 and/or within the condenser 140. The elevated total pressure may result in a phase change of the water vapor into liquid water once the mixture is moved to a higher-pressure condition via vacuum pump 120, for example, to the condenser 140.

In various embodiments, methods for operating water generation device 100 comprise adjusting the reduced pressure condition by adjusting a pump rate (e.g., vacuum pump 120 via controller 104) and/or adjusting the flow rate of carrier gas (e.g. via 160 as controlled by controller 104) into sorbent chamber 110 to continuously drive efficient water vapor release and capture from sorbent material 112. In various embodiments, forming, optimizing, and/or tuning the reduced pressure condition within sorbent chamber 110 includes controlling the pump rate to increase the ratio of partial pressure of water vapor on or above the sorbent material 112 to the partial pressure of water vapor disposed in the gas in sorbent chamber 110. Such an increased ratio may increase the water vapor output from the sorbent chamber 110 during the release time. In various embodiments, water generation device 100 is configured to improve efficiency of liquid water production at condenser 140 by adjusting the reduced pressure condition within sorbent chamber 110, for example by determining or adjusting a rate of carrier gas leaked or input into the interior volume of sorbent chamber 110, for example via inlet 160.

In one example, methods for operating wearable water generation device 100 comprise adjusting the reduced pressure condition by determining (e.g., by a device controller) that a wearer's body heat, temperature or metabolic rate has increased above a predetermined threshold, and in response, reducing the amount of energy (e.g., from onboard device battery) directed to the pumping device for reducing pressure within the sorbent chamber. In another example, methods for operating wearable water generation device 100 comprise determining (e.g., by a controller) that a wearer's body heat, temperature or metabolic rate has decreased below a predetermined threshold, and in response, activating the pumping device to reduce the pressure within the sorbent chamber. In yet another example, methods for operating wearable water generation device 100 comprise determining (e.g., by a device controller) an amount or quantity of water held by the sorbent material (e.g., via a conservation calculation of desorbed-to-absorbed mass based on known sorbent material properties and pressures and/or temperatures) and in response, determining a sorbent chamber pressure setpoint (e.g. decrease chamber pressure in response to a reduction in body heat or temperature, increase chamber pressure in response to an increase in body heat or temperature, and the like).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A water generation device comprising:
a sorbent chamber comprising a sorbent material to capture water vapor from ambient air during a load cycle, the sorbent material being configured to absorb thermal energy;
a vacuum pump configured to produce a reduced pressure condition within the sorbent chamber, thereby desorbing water from the sorbent material during a release cycle, wherein the reduced pressure condition increases a ratio of vapor pressure of water captured by the sorbent material to water vapor partial pressure in the sorbent chamber; and
a condenser for producing liquid water from the desorbed water vapor received from the vacuum pump;
wherein an outlet of the vacuum pump is configured to exchange heat from emitted water vapor therefrom to the sorbent chamber, thereby increasing at least one of a rate and a vapor pressure of water vapor desorbed from the sorbent material.

2. The water generation device of claim 1, wherein the sorbent material is configured to absorb thermal energy from:
a wearer of the water generation device;
solar radiation impinging on the atmospheric water generation device; or a combination thereof.

3. The water generation device of claim 1, further comprising a fan configured to cool the condenser.

4. The water generation device of claim 1, wherein the vacuum pump discharges:
the desorbed water vapor as steam at atmospheric pressure;
desorbed water vapor to a higher pressure than atmospheric pressure; or,
the desorbed water vapor to a higher pressure than atmospheric pressure via a compressor in combination with the vacuum pump.

5. The water generation device of claim 1, further configured to operate in an open loop thermodynamic cycle.

6. The water generation device of claim 1, wherein the sorbent material comprises:
an ionic liquid;
a solvent-less ionic liquid epoxy resin;
an ionic liquid entrained into a porous solid;
a metal-organic framework; or a combination thereof.

7. A water generation device comprising:
a sorbent chamber comprising a sorbent material to capture water vapor from ambient air during a load cycle, the sorbent material being configured to absorb thermal energy;
a vacuum pump configured to produce a reduced pressure condition within the sorbent chamber, thereby desorbing water from the sorbent material during a release cycle, wherein the reduced pressure condition increases a ratio of vapor pressure of water captured by the sorbent material to water vapor partial pressure in the sorbent chamber; and
a condenser for producing liquid water from the desorbed water vapor received from the vacuum pump;
wherein the water generation device is configured to exchange:
heat from the vacuum pump to the sorbent material; or,
heat from the condenser to the sorbent material such that a power requirement of the vacuum pump is reduced, thereby increasing a coefficient of performance.

8. The water generation device of claim 1, wherein the sorbent chamber comprises:
an inlet for inputting a gas leak during the release cycle; or,
an inlet for inputting a carrier gas leak comprising ambient air during the release cycle.

9. The water generation device of claim 1, further comprising a controller configured to:
communicate with one or more sensors;
maximize a water production rate in the condenser by adjusting the reduced pressure condition during a release time;
maximize a water production rate of the condenser by maintaining the reduced pressure condition below a predetermined setpoint in the sorbent chamber;
maintains the reduced pressure condition below the predetermined setpoint in the sorbent chamber by adjusting power input to the vacuum pump; or,
adjust a flow rate of a gas leak to maintain the reduced pressure condition in the sorbent chamber.

10. A method for operating a water generation device comprising:
capturing water vapor, by a sorbent material in a sorbent chamber, from ambient air during a load cycle;
forming a reduced pressure condition in the sorbent chamber during a release cycle; wherein forming the reduced pressure condition comprises:
adjusting the reduced pressure condition by adjusting a vacuum pump rate; or,
adjusting the reduced pressure condition by adjusting a flow rate of a carrier gas into the sorbent chamber;
desorbing water from the sorbent material during the release cycle during the release cycle; and
condensing water vapor output from the sorbent chamber into liquid water during the release cycle.

11. The method of claim 10, wherein the load cycle and the release cycle operate in an open loop thermodynamic cycle.

12. The method of claim 10, further comprising:
inputting a gas leak into the sorbent chamber during the release cycle; or,
inputting ambient air into the sorbent chamber.

13. The method of claim 10, wherein desorbing water from the sorbent material during the release cycle comprises:
exposing the sorbent material to a low grade heat source;
exposing the sorbent material to thermal energy from a wearer of the water generation device;
exposing the sorbent material to passive ambient heat;
exposing the sorbent material to solar energy; or, a combination thereof.

14. A method for operating a water generation device comprising:
capturing water vapor, by a sorbent material in a sorbent chamber, from ambient air during a load cycle;
forming a reduced pressure condition in the sorbent chamber during a release cycle;
desorbing water from the sorbent material during the release cycle during the release cycle;
condensing water vapor output from the sorbent chamber into liquid water during the release cycle;
determining a wearer's body condition; and,
adjusting the reduced pressure condition based on the determined body condition.

15. The method of claim 14, wherein the wearer's body condition comprises the wearer's body heat, temperature, metabolic rate, or a combination thereof.

16. The method of claim 14, wherein the method comprises determining the wearer's body condition has increased above a predetermined threshold; and, reducing an amount of energy input to form the reduced pressure condition based on the determined wearer's body condition.

17. The method of claim 14, wherein the method comprises determining the wearer's body condition has decreased below a predetermined threshold; and reducing a pressure within the sorbent chamber based on the determined wearer's body condition.

18. A method for operating a water generation device comprising:
   capturing water vapor, by a sorbent material in a sorbent chamber, from ambient air during a load cycle;
   determining an amount of water in the sorbent material;
   determining a sorbent chamber pressure setpoint based on the determined amount of water;
   forming a reduced pressure condition in the sorbent chamber during a release cycle;
   desorbing water from the sorbent material during the release cycle during the release cycle; and,
   condensing water vapor output from the sorbent chamber into liquid water during the release cycle.

19. The method of claim 18, further comprising adjusting the reduced pressure condition by adjusting a vacuum pump rate; or, adjusting the reduced pressure condition by adjusting a flow rate of a carrier gas into the sorbent chamber.

20. The method of claim 18, where the sorbent material comprises a porous desiccant, a silica gel, a metal-organic framework (MOF) or an ionic liquid.

* * * * *